Figure 1:
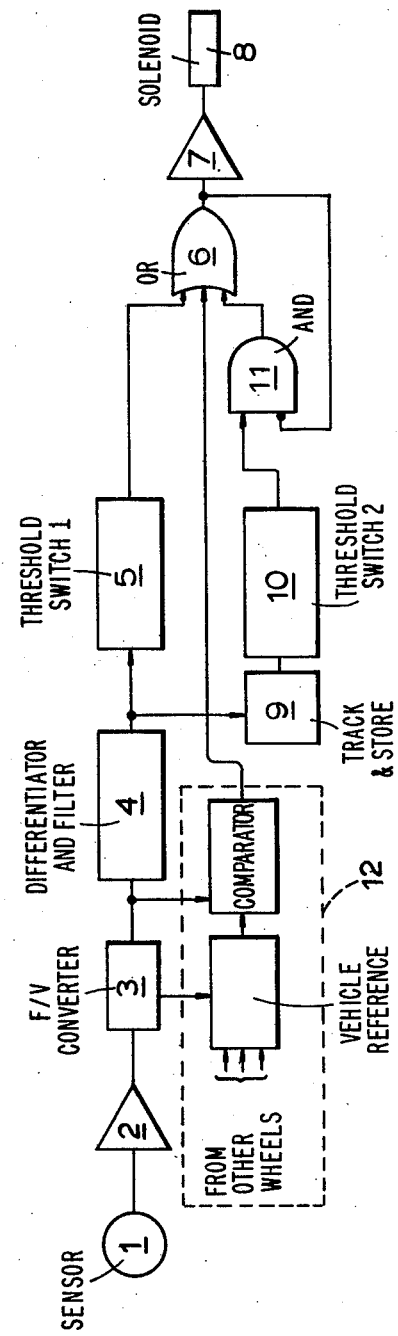

United States Patent [19]

Brearley et al.

[11] 4,146,276
[45] Mar. 27, 1979

[54] ANTI-SKID SYSTEM

[75] Inventors: Malcolm Brearley, Solihull; Paul J. Milsom, Gloucester, both of England

[73] Assignee: Girling Limited, Birmingham, England

[21] Appl. No.: 832,967

[22] Filed: Sep. 13, 1977

[30] Foreign Application Priority Data

Sep. 14, 1976 [GB] United Kingdom ............. 37959/76

[51] Int. Cl.² ............................................. B60T 8/08
[52] U.S. Cl. ..................................... 303/97; 303/110
[58] Field of Search ............... 303/105, 106, 107, 104, 303/110, 97, 92, 20

[56] References Cited

U.S. PATENT DOCUMENTS

| | | |
|---|---|---|
| 3,532,393 | 10/1970 | Riordan ................................. 303/104 |
| 3,604,761 | 6/1969 | Okamoto ................................ 303/97 |
| 3,652,136 | 3/1972 | Schlitz ................................... 303/20 |
| 3,861,758 | 1/1975 | Oglesbee ............................. 303/106 |
| 3,964,796 | 6/1976 | Bremer ................................. 303/92 |
| 3,966,267 | 6/1976 | McNinch ............................. 303/92 |

Primary Examiner—Trygve M. Blix
Assistant Examiner—Reinhard J. Eisenzopf
Attorney, Agent, or Firm—Scrivener, Parker, Scrivener and Clarke

[57] ABSTRACT

An anti-skid brake control system which is adapted to control the brake of a wheel comprising a brake release switch that produces a control signal to release the brake on detection of the onset of skidding of the wheel, a sensor for producing an electrical signal proportional to the angular acceleration of the wheel, a charging circuit which is responsive to the acceleration signal and produces a corresponding output signal so that the amplitude-time curves of the two signals cross-over one another after the acceleration peak resulting from release of the brake, and a brake re-applying switch which compares the acceleration signal and the output signal from the charging circuit and produces a control signal to re-apply the brake after the cross-over point. The charging circuit is preferably adapted so that the amplitude-time curves of the acceleration signal and output signal cross over one another after the deceleration peak as well as after the subsequent acceleration peak, and the brake re-apply switch produces a control signal to release the brake or hold the brake released or partially released during the period between the two cross-over points and to re-apply the brake after the second cross-over point.

17 Claims, 8 Drawing Figures

ANTI-SKID SYSTEM

This invention relates to an anti-skid brake control system.

It is known to control skidding of a braked wheel by providing wheel speed sensing means to produce a signal proportional to the angular acceleration of the wheel, and to use this acceleration signal to control release and re-application of the brakes. It has been appreciated that the point at which the wheel commences to skid following braking, can be related to the deceleration experienced by the wheel, and that skidding can be prevented by releasing the brakes at a predetermined value of the acceleration signal. Furthermore, it has been appreciated that following release of the brakes the wheel will accelerate to a maximum value and that it is appropriate to re-apply the brakes once this peak acceleration point has been reached, at which point the brake force coefficient is at a maximum. However, there is difficulty in some circumstances in detecting the peak acceleration point.

The present invention aims to provide an improved anti-skid brake control system which makes use of a wheel acceleration signal and more reliably determines the brake re-application point following brake release.

This object is achieved according to the present invention by providing a control system, which is adapted to control the brake of a wheel comprising brake release switch means that produces a control signal to release the brake on detection of the onset of skidding of the wheel, sensor means for producing an electrical signal proportional to the angular acceleration of the wheel, storing means which is responsive to the acceleration signal and produces a corresponding output signal whose amplitude follows that of the acceleration signal so that the amplitude-time curves of the two signals cross over one another after the acceleration peak resulting from release of the brake, and brake re-apply switch means which compares the acceleration signal and the output signal from the storing means and produces a control signal to re-apply the brake after the cross-over point.

Preferably, the storing means is a charging circuit which has different response times for positive and negative rates of change of the acceleration signal so that the output signal more rapidly follows the acceleration signal immediately prior to the acceleration peak than it does thereafter, thereby ensuring that the required cross-over point is produced.

Further, the storing means is preferably adapted so that the amplitude-time curves of the acceleration signal that the output signal cross-over one another after the deceleration peak as well as after the subsequent acceleration peak, and the brake re-apply switch means produces a control signal to release the brake or hold the brake released or partially released during the period between the two cross-over points and to re-apply the brake after the second cross-over point. Release of the brake is still initiated by the brake release switch means, but this is supplemented by the control signal from the brake re-apply switch means.

The brake release switch means may be such as to compare the acceleration signal with a preset reference value of deceleration and to produce the brake release control signal while the reference value is exceeded. Once the acceleration signal falls below the reference value, further brake release or an intermediate hold period is preferably controlled by the control signal from the brake re-apply switch means prior to brake re-application being signalled.

Different stages of brake pressure release and holding may be produced by providing separate valves to control the inlet pressure demand to the brakes and to control the release of pressure from the brake actuators, both valves being controlled by the brake release signal from the brake release switch means but only the inlet control valve being controlled by the control signal from the brake re-apply switch means.

The brake release switch means may be adapted so that the brake release control signal which it produces is of variable duration depending upon the form of the acceleration curve, the brake release period being longer for more gradual acceleration gradients so as to release the brakes to a greater extent and ensure wheel recovery and the associated acceleration peak. In an embodiment in which brake release switch means is adapted so as to switch-over and produce the brake release signal at a reference value and to reset at the reference value again once the deceleration peak has passed, automatic adjustment means is provided to reduce the reference value in a predetermined manner with time following the first switching operation so that the reset time and thus the brake release period varies with the acceleration gradient as required.

A control system according to the invention will operate reliably to control re-application of the brakes provided a pronounced acceleration peak is produced following brake release. However, when low friction conditions exist at the wheel surface, a localised acceleration peak may not be produced. In order to deal with this situation, the storing means is adapted according to an important subsidiary feature of the invention, by arranging that the output signal which it produces decays gradually with time so that eventually it falls to the zero level of the acceleration signal provided no pronounced acceleration peak occurs, whereupon the brake re-apply switch means performs a switching operation to re-apply the brakes.

According to a further subsidiary feature of the invention, a monitor circuit in the form of a timer is provided in a control system controlling successive brake release and holding periods so that the hold period is terminated after a preset duration, if brake re-application is not otherwise triggered by the system. Preferably, the timer terminates the hold period and triggers brake re-application by passing an electric pulse simulating an acceleration peak, to the input of the storing means.

Figure 2:
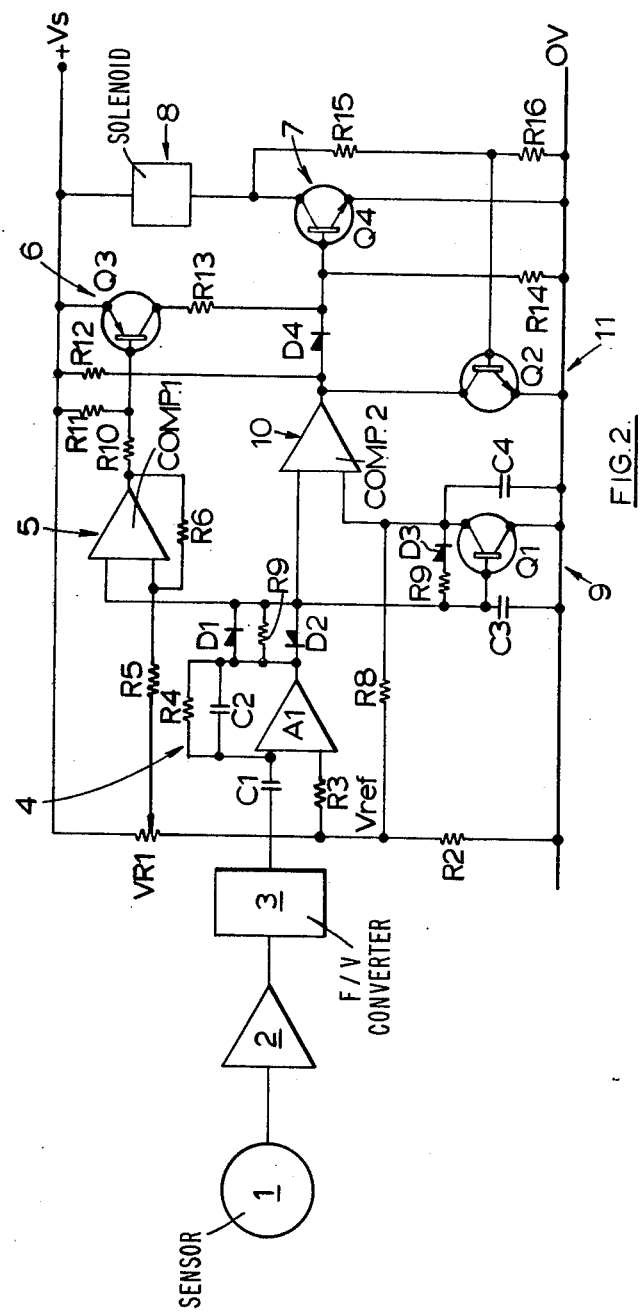
Figure 3A:
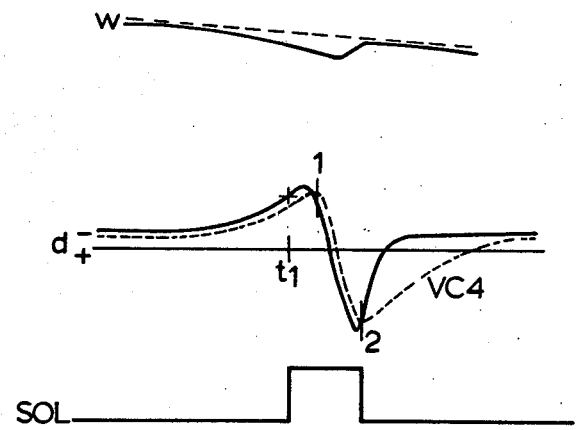
Figure 3B:
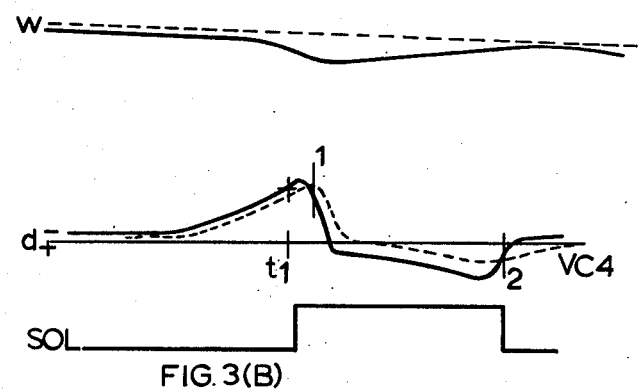
Figure 3C:
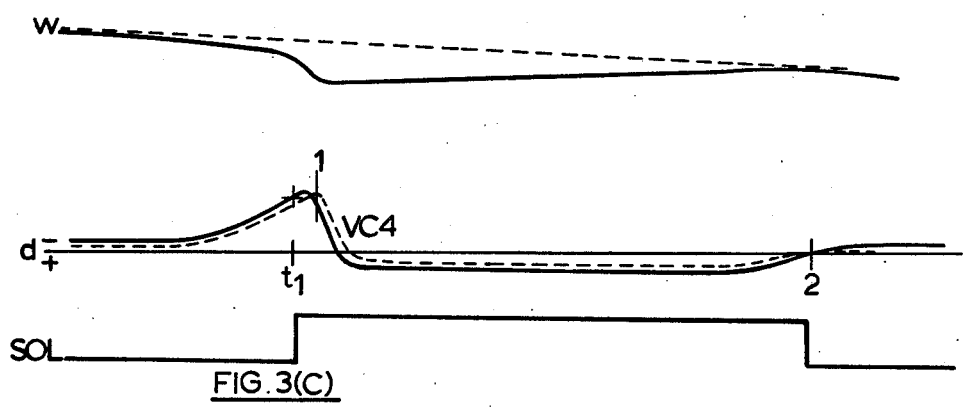
Figure 4:
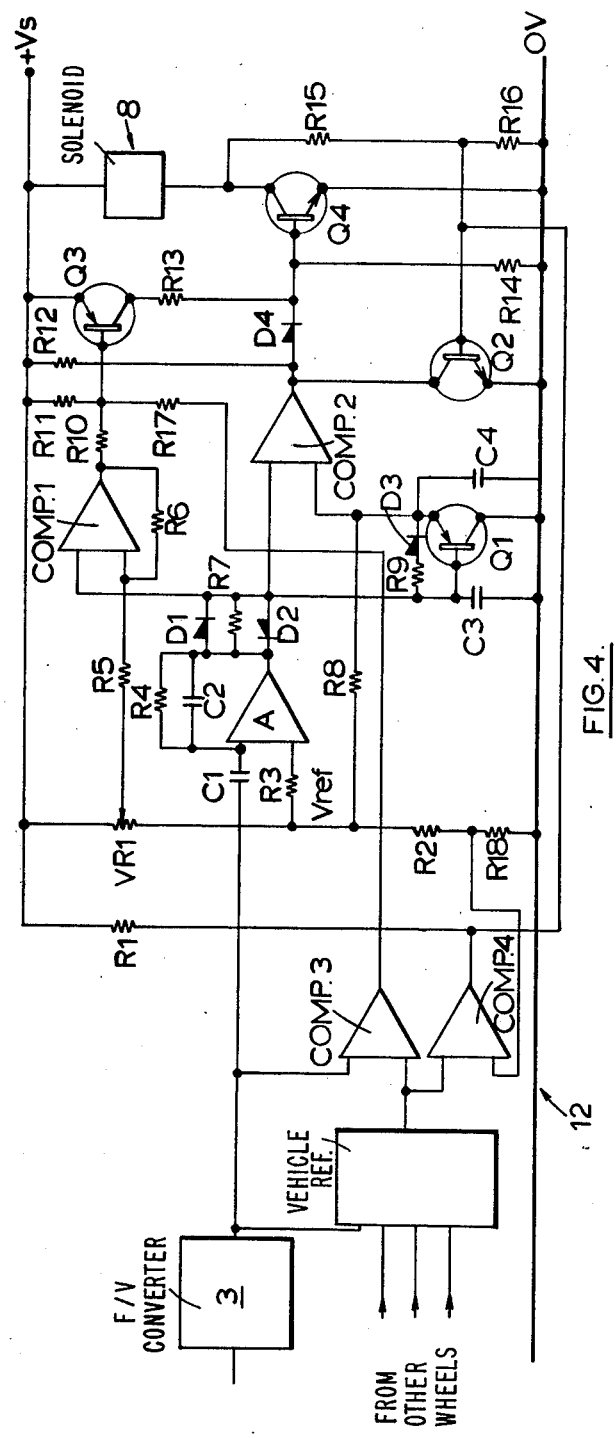
Figure 5:
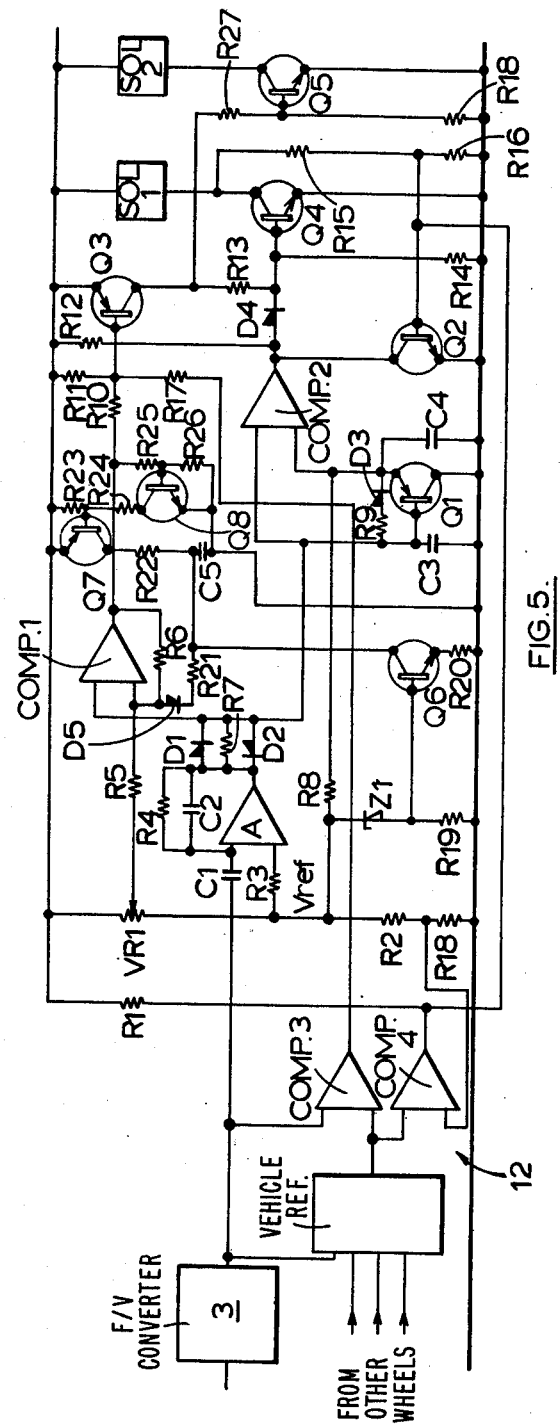
Figure 6:
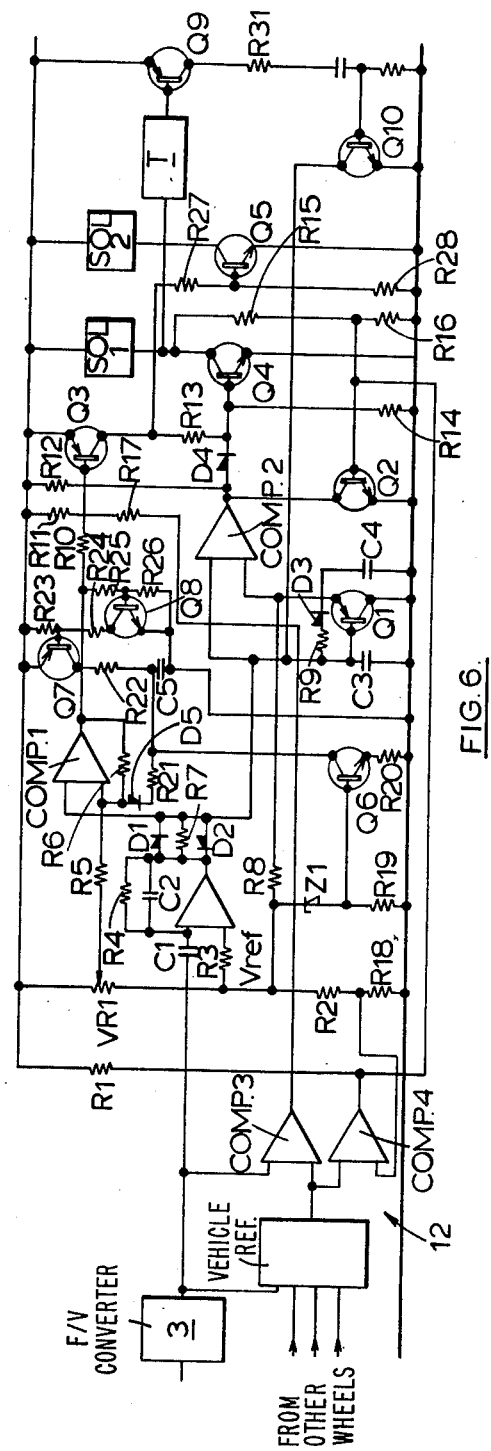

The invention will now be described by way of example with reference to the accompanying drawings in which:

FIG. 1 is a block diagram of an anti-brake control system which incorporates the invention, FIG. 2 is a circuit diagram of part of the system of FIG. 1, FIGS. 3A to 3C are graphs of typical wheel speed and differentiator output signals obtained in the operation of the circuit of FIG. 2 under different conditions of surface $\mu$, FIG. 4 is a circuit diagram similar to that of FIG. 2 but including details of the optional slip detection means shown in FIG. 1, FIG. 5 is a circuit diagram of an alternative embodiment for controlling a double solenoid actuator, and FIG. 6 is a circuit diagram showing a modification to the circuit of FIG. 5 to limit the duration of the hold period.

The control system shown in FIG. 1 comprises a wheel of axle speed sensor 1 and an input amplifier 2 designed to produce fixed amplitude square wave pulses with a repetition rate proportional to the speed of the wheel or axle. A frequency/voltage converter 3 acts on the edges of these pulses to produce a dc voltage proportional to the wheel speed, and this wheel speed signal passes to a linear differentiator circuit 4 which produces a signal proportional to the deceleration and acceleration of the wheel or axle. The differentiator 4 also includes filtering means to remove the unwanted signal components produced by the converter 3. The deceleration signal from the differentiator is compared with a threshold value preset in a first threshold switch 5 and corresponding to incipient skid conditions. The switch 5 sends a control signal via an OR gate 6 and amplifier 7 to a solenoid 8 in the actuator to relieve the braking pressure whenever this skid threshold is exceeded.

In addition, the differentiator output signal is fed to a track and store circuit 9 which forms the input stage of a second threshold switch 10 which controls the reapplication of brake pressure via an AND gate 11 which provides an alternative input to the OR gate 6 to operate the solenoid 8 once an initial energisation has been made.

Additionally, the control system includes optional means 12 for comparing wheel speeds either mutually or against vehicle speed analogue used as a reference, as an alternative means of detecting skid conditions where a very gradual rate of skid development is to be expected.

FIG. 2 shows the circuit diagram for the differentiating circuit 4, the track and store circuit 9, the two threshold switches 5 and 10 and the gating and amplifier circuits driving the solenoid 8. The differentiator 4 comprises an amplifier A1 with feedback and input components R4, C1. The quiescent output operating point of the differentiator is set by Vref the centre point of potential divider VR1 and R2. The differentiator is subject to a level of filtering set by C2, R4 which removes the effects of converter ripple at low wheel speeds. However, this level of filtering is insufficient to reject the differentiator noise output produced by roughness of the surface over which the wheels are running; increasing the time constants to reject such noise would produce a delay which is serious to actual signals produced by a wheel about to skid. A non-linear filter formed from components D1, D2, R7 and C3 offers increased filtering to low level signals insufficient to cause conduction in diodes D1 and D2, but does not result in a large delay being caused to higher level signals, such as those which indicate the onset of skid conditions, which are greater than 0.5 volts in amplitude.

The first threshold switch 5 comprises an integrated circuit comparator COMP 1 which detects deceleration signals greater than a skid threshold preset by adjustment of VR1. This comparator switching causes conduction of transistor Q3 (OR gate 6) which turns on the solenoid 8 via driver transistor Q4 (amplifier 7), thereby relieving the applied brake pressure. The comparator has a small level of positive feedback which generates a preset hysteresis to prevent oscillation about the switching point in the face of a remaining differentiator noise level.

The second threshold switch 10 comprises an integrated circuit comparator COMP 2 which is fed with inputs from the differentiator 4 and from the track and store circuit 9. The track and store circuit comprises components C4, R9, D3 and Q1, the capacitor C4 being charged via diode D3 and resistor R9 by the deceleration signal from the differentiator while this is positive, that is, while the wheel is decelerating. The rate at which the voltage on capacitor C4 follows the wheel deceleration signal is limited by resistor R9 to prevent the capacitor voltage responding to short lived transients resulting from sudden surface irregularities.

As a normal wheel deceleration develops, the capacitor voltage VC4 tracks the deceleration voltage appearing across C3, and as the corrective action reduces brake torque the deceleration starts to fall leaving C4 charged to a higher level than C3. When this voltage difference reaches a sufficient potential to cause Q1 to conduct, the stored charge on C4 is reduced causing C4 to follow even the most rapid fall of voltage from the differentiator due to Q1 acting as an emitter follower and providing a high current discharge path independent of the filter output impedance. However, because of the defined base emitter voltage drop under these conditions, C4 maintains a certain potential difference with respect to the voltage appearing across C3 and this difference is applied to the input of comparator COMP 2. Thus comparator COMP 2 will produce a positive output signal commencing shortly after the deceleration peak, once said potential difference is produced, and persists during subsequent wheel speed recovery until the acceleration starts to fall after reaching a maximum point at which the brake force coefficient is at a maximum. After this acceleration peak, the acceleration signal falls and finally the potential difference applied to comparator COMP 2 falls to the level at which it resets, thereby cancelling its positive output voltage and de-energising the solenoid 8 so that brake pressure is reapplied. The positive output voltage from COMP 2 acts via R12 and D4 to maintain transistor Q4 conducting and solenoid 8 thereby energised after the deceleration signal has fallen below the threshold value of COMP 1 and the latter has reset.

Comparator COMP 2 cannot cause the inception of any solenoid energisation period as the circuit is normally disabled by the clamping action of a conducting transistor Q2 maintained with a base drive until the solenoid is initially energised by COMP 1 switching as the first deceleration threshold is exceeded.

FIG. 3 shows graphs of wheel speed w, differentiator output d, track and store signal VC4 and solenoid energisation signal, which are produced for three different levels of surface $\mu$ coefficients.

In FIG. 3A the surface $\mu$ is high but not sufficiently high to prevent overbraking. A wheel skid cycle is illustrated where incipient skidding is signalled by COMP 1 as its threshold is exceeded at t1. The trend towards wheel lock is rapidly countered by the brake relief caused by COMP 1 energising the solenoid 8. As the wheel deceleration falls, the output voltage of the differentiator on C3, falls to a level lower than that stored on C4, which is shown by the dotted line. The comparator COMP 2 is sensitive to conditions which generate C4 voltage greater than C3 and produces a switched output at point 1 on each curve to maintain the solenoid 8 energised until the differentiator output voltage has fallen to a minimum level and commenced a positive rise as at point 2 on the dotted curve.

FIG. 3B shows a similar operation at a lower surface adhesion level where the wheel recovery acceleration is less pronounced than in FIG. 3A but still produces a detectable minimum voltage from the differentiator to cause COMP2 to switch off at point 2 as a voltage rise appears after the peak acceleration.

In FIG. 3C, characteristic conditions corresponding to a very low $\mu$ surface are illustrated. Here the variation in wheel spin-up torque is insufficient to provide any definite indication of an optimum brake re-application point, and under these conditions of constant low level re-acceleration, use is made of the fact that additionally C4 is being charged towards the zero acceleration level of the differentiator output voltage by a resistive path formed from resistor R8 connecting the capacitor C4 to the differentiator quiescent setting potential, which is preset accurately by potential divider components VR1 and $R_2$. Thus, provided a minimum acceleration level is maintained, as shown in FIG. 3C the emitter follower Q1 is held lightly conducting so as to support an adequate positive bias on C4 supplied through R8, to hold COMP 2 in the switched condition. Once this acceleration falls to zero, the comparator output drive is removed and solenoid energisation terminated. Thus, in the absence of a detectable maximum in the acceleration recovery curve, the circuit selects the end of such acceleration as the brake re-application point.

Many anti-skid brake control systems have been proposed having an alternative or additional means of initial skid detection which senses wheel speed differences, or forms a vehicle reference analogue suitably scaled to the wheel speed measurements and compares each wheel speed with this reference in order to generate wheel slip signals and signal brake release whilst the slip level exceeds a preset threshold. Such wheel slip detection means 12 is included as an optional feature in the illustrated embodiment, of FIG. 1.

The comparator COMP 2 is also useful with such wheel slip detection means in that it allows a wider comparator band to be employed obviating any problem with tight channel calibration yet prevents premature re-application because of the wider band width.

The wheel slip detection means 12 is shown in more detail in FIG. 4. Excess wheel slip is signalled from a comparator COMP 3 which turns on transistor Q3 in exactly the manner as previously described for comparator COMP 1 Q4 is consequently caused to conduct and the solenoid 8 is energised and the clamping action of Q2 is released. A deceleration, whilst not exceeding the first threshold, will be present to some extent and will fall as recovery takes place, thereby causing the voltage across C4 to exceed that across C3 and the comparator COMP 2 to maintain the solenoid energised until after a differentiator output minimum has been detected.

With such a vehicle reference, a further comparator COMP 4 can be employed to signal that the vehicle is operating at a very low speed at which anti-skid brake control action should be inhibited. The low speed inhibit can be applied to COMP 2 by using the positive signal from COMP 4 to turn on Q2 and thereby clamp any output signal that would otherwise maintain the solenoid energised.

When maximum efficiency is being sought from an anti-skid brake control system an improvement can be obtained, provided good control is exercised over the re-application point, by utilisation of a dual solenoid actuator in which control of brake pressure can be effected in three states namely: (1) pressure reduction, (2) pressure hold or possibly slow fall, (3) pressure rise, possibly fast rise and slow rise.

The two solenoids would for example have the direct functions of control of brake pressure release or dump, and control of admission of demand pressure by manipulation of the inlet valve. The control system described can be readily adapted to this type of system by rearrangement of the logic connections of the output stages as shown in the circuit of FIG. 5.

Here solenoid SOL 1 which controls the inlet valve takes the place of the single solenoid 8 employed in FIGS. 2 and 4, and an additional solenoid SOL 2 controlling the dump function is driven via Q5 from the skid detecting circuits which control transistor Q3. Thus the control signal from COMP 1 controls both solenoids SOL 1 and SOL 2 so that SOL 1 is energised to close the inlet valve and SOL 2 is energised to open the dump valve when a deceleration greater than the threshold or excess slip conditions exist. The control signal from COMP 2 controls only solenoid SOL 1, and does this in the manner described above in relation to the single solenoid 8. Thus, when COMP 1 resets following a fall in deceleration below the threshold value, it releases both solenoids, but solenoid SOL 1 is now energised by the signal from COMP 2. The inlet valve is therefore held closed while the dump valve is closed, thereby producing a pressure hold period until COMP 2 signals re-application of the brakes, whereupon solenoid SOL 1 is de-energised and the inlet valve is opened.

Such a control system has the objective of making one detecting channel of major importance, leaving the second channel to have a back up role, the measured re-application system is used to make the differentiator 4 the primary means of skid detection and control, and the slip detecting comparator COMP 3 acts in a support role for situations where a skid appears due to very marginal over-braking and may only gradually develop excess slip without any sudden plunge into lock. The great majority of impending lock conditions are signalled by the deceleration threshold being exceeded and where rapid corrective action can prevent the slip comparator being invoked. For improved efficiency it is desirable to attempt to maintain as high a brake pressure during the subsequent hold period as is consistent with ensuring certain recovery. Under some circumstances the dump period can be terminated when the deceleration falls below the initial threshold if measurement and actuation delays are taken into account, whilst under other conditions the dump must be extended to make recovery positive. The system is therefore further modified in that the deceleration sensing comparator threshold is dynamically adjusted once the dump solenoid has been actuated and this adjustment is made in three parts.

To prevent oscillation around the initial switching point, the comparator COMP 1, has a measure of positive feedback incorporated by R6 on first switching to give a slight fall in threshold level of some 20%. After a preset first delay period 1 adjusted to be longer than the duration of all normal surface noise pulses and in one embodiment of the invention, typically 100 mS, the threshold level for switch off is allowed to fall from 80% of the initial figure, on a substantially linear characteristic over a preset longer second period 2, down to a final fixed value typically between 5% and 10% of the initial threshold. Thus for good surface $\mu$ conditions where rapid correction can be expected with comparatively small pressure reduction the switch off can be made sooner in the cycle and thus at a higher threshold than for lower μ conditions where correction takes longer and must be made at lower pressure through the employment of a longer dump period, terminated only when the wheel deceleration has virtually ceased. Variation of the end of dump timing in this manner provides that the maximum pressure is maintained during the hold period for improved efficiency and reduced cycling rate.

The circuit shown in FIG. 5 incorporates a modification involving three additional transistors to allow individual adjustment of periods 1 and 2 whilst holding the final threshold level linked to the differentiator quiescent level to reduce any problems associated with drift in the differentiator or the setting reference potential Vref. When the initial detection is made comparator 1 output voltage falls to zero causing Q8 and Q7 to turn off in turn. The potential on C5 at this point is set by the voltage drop produced across R22 by the flow of constant current from the Q6 collector source, and is arranged to be higher than the first threshold setting so that diode D5 does not conduct. The capacitor voltage falls linearly from this level due to the constant current drawn by Q6, so that at a point marking the end of the first period diode, D5 is caused to conduct via R21 when the capacitor voltage falls below the initial threshold voltage. Further fall in this voltage takes place during period 2, linearly reducing the switch off threshold until the collector voltage of Q6 falls to the saturation level determined by the base voltage. This voltage is set at a defined level below the quiescent setting potential Vref by a close tolerance Zener diode Z1 thereby linking the final threshold to Vref so that the two points track together to maintain the accuracy of this final threshold in deceleration terms. The operation of all other sections of the circuit shown in FIG. 5 is exactly as described in relation to FIGS. 2 and 4 except that any noise pulse in the deceleration direction appearing at the differentiator filter output is likely to produce a shorter pulse out of Q3, giving shorter solenoid pulses which end before the comparator COMP 2 circuit has switched over due to the deliberately slow following rate applied to positive going signals as set by R9.

A modification to the anti-skid brake control system of FIG. 5 is shown in FIG. 6, whereby a monitor circuit is provided to check the duration of the hold period, that is, the time for which the solenoid SOL 1 is energised, and to reset the comparator COMP 2 to terminate the hold period after a preset time. The monitor comprises a solenoid timer T which operates while the solenoid SOL 1 is energized and which at the end of said preset time causes a transistor Q9 to conduct. The rising voltage at the collector of Q9 passes via a capacitor C6 to cause a transistor Q10 to conduct briefly while capacitor C6 charges. This conduction pulse is transferred to the acceleration input of COMP 2 as a negative pulse which is followed by the track and store circuit 9 and thereby induces a cross-over which resets COMP 2, switching off Q4 and de-energising SOL 1.

This monitor circuit is useful in preventing long hold periods being induced by electrical or track noise which can cause a sudden deceleration signal which is not followed by a recovery acceleration. Typically the solenoid timer T gives a preset maximum hold period of 5 to 7 seconds.

As an overall protection circuit in the event of a faulty comparator, an additional timer can be provided to monitor both solenoids and to de-activate the whole control system if either solenoid is energised for longer than a preset time, typically 10 seconds.

We claim:

1. An anti-skid brake control system which is adapted to control the brake of a wheel comprising brake release switch means that produces a control signal to release the brake on detection of the onset of skidding of the wheel, sensor means for producing an electrical signal proportional to the angular acceleration of the wheel, storing means which is responsive to the acceleration signal and produces a corresponding output signal whose amplitude follows that of the acceleration signal so that the amplitude-time curves of the two signals cross over one another after the acceleration peak resulting from release of the brake, and brake re-applying switch means which compares the acceleration signal and the output signal from the storing means and produces a control signal to re-apply the brake after the cross-over point.

2. A control system as claimed in claim 1 in which the storing means comprises a charging circuit.

3. A control system as claimed in claim 2 in which the charging circuit has different response times for positive and negative rates of change of the acceleration signal so that the output signal more rapidly follows the acceleration signal immediately prior to the acceleration peak than it does thereafter.

4. A control system as claimed in claim 3 in which the charging circuit comprises a capacitor connected via a charging path to the sensor means so as to be charged by a signal proportional to the angular deceleration of the wheel during wheel deceleration, and an electronic switch connected in a discharge path of the capacitor and controlled by the potential difference between the acceleration signal and the output signal so as to discharge the capacitor in rapid dependence on the acceleration signal while the potential difference exceeds a predetermined level prior to the acceleration peak.

5. A control system as claimed in claim 1 in which the brake re-apply switch means comprises a comparator circuit that is such as to respond to the relative polarity of the acceleration and output signals and to perform a switching operation following a reversal of polarity at the cross-over points.

6. A control system as claimed in claim 1 in which the storing means is such that the amplitude time curves of the acceleration signal and output signal cross-over one another after the deceleration peak and again after the subsequent acceleration peak resulting from release of the brake, and the brake re-apply switch means produces a control signal during the period between the two cross-over points.

7. A control system as claimed in claim 6 in which the control signal produced by the brake re-apply switch means between the two cross-over points serves to release the brake.

8. A control system as claimed in claim 6 in which the control signal produced by the brake re-apply switch means between the two cross-over points serves to hold the brake in the released state produced by the brake release control signal.

9. A control system as claimed in claim 8 in which the brake release control signal simultaneously controls two separate brake pressure control valves, one of which controls the inlet pressure demand to the brake and the other of which controls the release of pressure from the brake; and in which the control signal produced by the brake re-apply switch means between the two cross-over points controls only the inlet control valve.

10. A control system as claimed in claim 8 which includes a monitor circuit in the form of a timer that terminates the hold period after a preset duration if brake re-application is not otherwise triggered by the brake re-apply switch means.

11. A control system as claimed in claim 10 in which the timer terminates the hold period by passing a pulse to the acceleration signal input of the storing means, thereby inducing a cross-over point to trigger the brake re-apply switch means.

12. A control system as claimed in claim 6 in which an inhibit signal renders the brake re-apply switch means ineffective in releasing or holding the brake, and in which the brake release control signal serves to remove this inhibit.

13. A control system as claimed in claim 1 in which the brake release switch means comprises a comparator circuit that compares the acceleration signal with a preset reference value of deceleration and produces a brake release control signal while the reference value is exceeded.

14. A control system as claimed in claim 13 in which the brake release switch means includes automatic adjustment means which reduces the reference value in a predetermined manner with time following operation of the brake release comparator circuit to produce the brake release control signal.

15. A control system as claimed claim 1 in which the storing means is adapted so that the output signal that it produces decays with time until it falls to the zero level of the acceleration signal, and in which the brake re-apply switch means is such as to operate and produce the brake re-apply control signal when the output signal assumes said zero level of the acceleration signal.

16. A control system as claimed in claim 1 which includes a sensor that produces a signal proportional to the angular speed of the wheel, and additional brake release switch means that compares the wheel speed signal from the sensor with a reference wheel speed signal and produces a brake release control signal when the relative values of the two signals differ by a preset amount indicative of excess wheel slip.

17. A control system as claimed in claim 1 which includes a sensor that produces a signal proportional to the angular speed of the wheel, and low speed switch means that compares the wheel speed signal with a preset low speed signal and produces a control signal to inhibit operation of the control system below said low speed.

* * * * *